H. L. LITCHFIELD & C. E. SHIPLET.
BROADCAST SPREADER.
APPLICATION FILED SEPT. 22, 1915.
1,267,563.
Patented May 28, 1918.
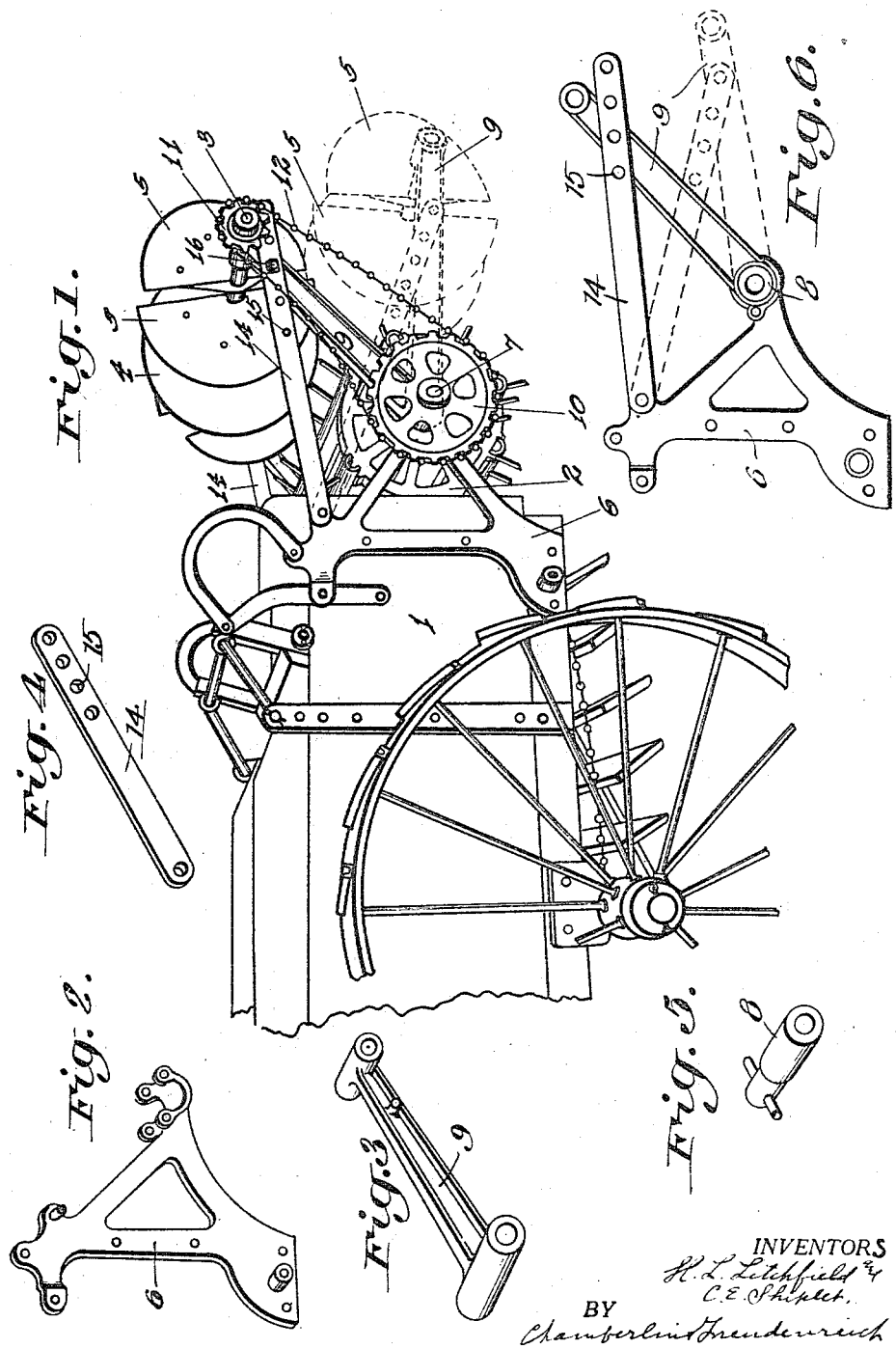

UNITED STATES PATENT OFFICE.

HENRY L. LITCHFIELD AND CLARENCE E. SHIPLET, OF WATERLOO, IOWA, ASSIGNORS TO THE LITCHFIELD MANUFACTURING COMPANY, OF WATERLOO, IOWA, A CORPORATION OF IOWA.

BROADCAST SPREADER.

1,267,563.          Specification of Letters Patent.       Patented May 28, 1918.

Application filed September 22, 1915. Serial No. 51,932.

*To all whom it may concern:*

Be it known that we, HENRY L. LITCHFIELD and CLARENCE E. SHIPLET, citizens of the United States, residing at Waterloo, county of Blackhawk, State of Iowa, have invented a certain new and useful Improvement in Broadcast Spreaders, and declare the following to be a full, clear, and exact description of the same, such as will enable others skilled in the art to which it pertains to make and use the same, reference being had to the accompanying drawings, which form a part of this specification.

In the ordinary manure spreader the distributing drum or beater wheel discharges the manure across a comparatively narrow zone corresponding to the axial length of the drum or wheel. Therefore, in order to cover the entire surface of a field, no matter how lightly, it is necessary to cause the spreader to make a number of trips corresponding to the width of the field divided by the width of the zone over which the manure would be spread during a single trip. The present invention relates to means for widening the zone of distribution of the spreader and has for its object to produce a simple mechanism for this purpose adapted to operate efficiently under the various conditions of service to be encountered.

In carrying out our invention we employ in connection with the primary distributing means an auxiliary distributer which receives the material from the primary wheel and, in discharging it, spreads it laterally in both directions. As the nature of the material to be distributed varies and, as the speed at which the spreader is being drawn, depending upon whether a rapidly walking team or a slowly walking team is being employed, the angle to the horizontal at which the material leaves the ordinary beater wheel also varies and, considered in one of its aspects, our invention has for its object to provide means for adjusting the auxiliary spreader in a simple and convenient manner so as to make it possible to locate it in the most advantageous manner relative to the primary distributing means and stream of material passing from the latter under the varying conditions encountered in actual practice.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a perspective view of the rear end of a spreader arranged in accordance with a preferred embodiment of our invention;

Fig. 2 is a perspective view of one of the brackets on which the primary beater wheel is mounted;

Fig. 3 is a perspective view of one of the swinging arms for carrying the auxiliary or secondary distributing device;

Fig. 4 is a perspective view of one of the links, holding the supporting arms for the auxiliary beater wheel in various positions of adjustment;

Fig. 5 is a perspective view of the supporting members for the inner end of one of the arms shown in Fig. 3; and Fig. 6 is a side view of the parts illustrated in Figs. 2 to 5 assembled, the full and dotted lines showing different adjustments.

Referring to the drawings, 1 represents the box or bed of an ordinary distributer at the rear end of which is mounted a rotary distributing device which, in the present instance, is illustrated as taking the form of a toothed drum 2, commonly known as the beater wheel. In rear of the beater and rotatable about an axis parallel with that of the latter is an auxiliary spreading device which may conveniently take the form of a rapidly rotating shaft, 3, having thereon screw devices, the screw devices from the middle toward one end being right and those from the middle toward the other end being left so that as the material discharged from the primary distributer reaches the secondary distributer it is not only discharged rearwardly but also laterally, being discharged in a fan-shaped stream. Of course the secondary distributer need not be made in the form of a right and left hand screw but it may have any construction which is somewhat in the nature of a screw and spreads a stream discharged therefrom so as to make it wider than it was when it approached the secondary distributer. In the arrangement illustrated, the spreading devices of the auxiliary distributer are in the form of disks, 4, and half disks, 5, secured upon the shaft 3 so as to give the effect of a right and left hand screw.

As heretofore explained, the angle at which the material leaves the primary distributer varies according to the nature of the material and the speed at which the spreader is traveling and therefore in order to make the auxiliary distributer effective under all conditions, means must be provided which permit it at all times to be located in the proper place to act most advantageously on the stream of material which is leaving the primary distributer. Since the material leaves the main beater wheel tangentially the secondary distributer, after having once been properly located with respect to the stream, may always be kept in proper adjustment, regardless of the angle of the stream to the horizontal, by shifting the position of the secondary distributer in the arc of a circle having the axis of the primary distributing wheel as its center. Thus if the material which is to be distributed is heavier than that which was previously distributed or if the team of horses which is drawing the spreader moves more slowly than the one previously used, so that if the material leaves the beater wheel at a later period, the proper relation between the two distributers may be obtained by simply lowering the auxiliary distributer to meet the new conditions.

In the arrangement illustrated, the primary beater wheel is supported at its ends in brackets, 6, secured to the body of the spreader; the shaft, 7, of the wheel extending through short sleeves, 8, arranged in bearings in the corresponding brackets. On each of these sleeves is journaled the inner end of an arm, 9, in the outer ends of which is journaled the shaft, 3, of the secondary distributer. On one end of the shaft 7 is a sprocket wheel, 10, and on the corresponding end of the shaft 3 is a smaller sprocket wheel, 11, the two being connected by a chain, 12. It will be seen that the arms 9 support the shaft 3 so that it will always be at the same distance from the shaft 7 although its angular relation to the shaft may be varied. In order to support the auxiliary beater wheel in any one of several positions, we have provided links or connecting rods, 14, each connected at one end to the upper portion of one of the brackets 6 and having at its other end a series of holes, 15, through any one of which may be inserted a bolt, 16, or other fastening device which also passes through the corresponding arm 9. In order to adjust the secondary distributing drum the bolts or other fastening devices 16 are removed, permitting the auxiliary distributer to be raised or lowered as conditions require, the fastening devices being then placed in such of the holes in the members 14 as will retain the auxiliary distributer in the position into which it has been brought.

While we have illustrated and described with particularity only a single preferred form of our invention, we do not desire to be limited to the exact structural details thus illustrated and described; but intend to cover all forms and arrangements which come within the terms employed in the definitions of our invention constituting the appended claims.

We claim:

1. In an apparatus of the character described, a primary distributer adapted to throw a stream of material outwardly and rearwardly, a secondary distributer in position to receive said stream and give the elements thereof added momentum, and means for adjusting the elevation of said distributers relatively to each other, to maintain the proper relation between them under different conditions of material and speed of operation.

2. In an apparatus of the character described, a primary distributer adapted to discharge a stream of material, a secondary distributer in position to act on said stream and deliver to it an impulse cumulative to the impulse received from the primary distributer, and means for adjusting one of said distributers angularly about the axis of the other.

3. In an apparatus of the character described, a rotary primary distributer adapted to throw a stream of material outwardly and rearwardly, a secondary distributer rotatable in the same direction as the primary distributer and positioned to receive a stream after it leaves the primary distributer, and means for adjusting the elevation of said distributers relatively to each other to maintain the proper relation between them under different conditions of material and speed of operation.

4. In an apparatus of the character described, two distributers positioned to act one after the other on oncoming material to discharge the same, the first of the distributers being adapted to deliver the material to the second distributer in the form of a stream projected through space, and the second distributer including means for acting on the stream to cause it to continue its flight and at the same time be widened, and means for adjusting said distributers relatively to each other to maintain the proper relation between them under different conditions of material and speed of operation.

5. In an apparatus of the character described, a rotary beater wheel, a rotary distributer adapted to turn in the same direction as the beater wheel, and means for supporting said distributer so as to permit it to be adjusted through a considerable angle from a point in rear of to a point above and in rear of the beater wheel.

6. In an apparatus of the character described, a rotary beater wheel, a rotary distributer, a pair of arms journaled so as to swing about the axis of the beater wheel, means for supporting said distributer in the outer ends of said arms, and means for holding said arms in various angular positions so as to permit the distributer to be adjusted from a position in rear of to a position above and in rear of the beater wheel.

7. In an apparatus of the character described, a bed for containing material to be distributed, a beater wheel mounted on a shaft extending transversely of the bed at the rear end of the latter, two arms journaled upon said shaft at the ends of the beater wheel and extending radially beyond the beater wheel, a secondary distributer mounted between the outer ends of said arms, links extending rearwardly from the bed past said arms, and means for connecting said arms to said links at any one of a plurality of points distributed lengthwise of the latter.

8. In an apparatus of the character described, a rotary beater wheel, a distributer and spreader arranged in rear of the beater wheel and rotatable in the same direction as the latter, and means for adjusting said distributer about the axis of the beater wheel through a considerable angle to permit the material discharged from the beater wheel to be received by the distributer at approximately the same point on the latter irrespective of the character of the material or the speed of rotation.

9. In an apparatus of the character described, a primary distributer in the form of a rapidly rotatable beater wheel adapted to throw a stream of material outwardly and rearwardly, a secondary distributer arranged in rear of the other in position to receive said stream and give the elements thereof impulses cumulative to the impulses received from the primary distributer, and means permitting the secondary distributer to be adjusted bodily about the primary distributer through an arc of considerable length having its center at the axis of the primary distributer.

10. In an apparatus of the character described, a primary distributer, a secondary distributer arranged behind the primary distributer and adapted to receive from the latter a stream of material and without checking its progress give it added momentum, and means for permitting the rearmost distributer to be raised and lowered in order to bring it to the best elevation for any given condition of material and speed of operation for the purpose of receiving the stream from the primary distributer.

11. In an apparatus of the character described, a primary distributer adapted to throw a stream of material outwardly and rearwardly, a secondary distributer in position to receive said stream and give the elements thereof added momentum, and means for adjusting the secondary distributer in the vertical direction for the purpose of permititng it to operate efficiently on streams varying as to the character of material and as to speed of travel.

12. In an apparatus of the character described, a rotary wide spreading distributer, a rotary primary distributer adapted to throw a stream of material in a direction to be caught in its flight by the wide spreading distributer and be given an added impulse by the latter, and means permitting the secondary distributer to be adjusted bodily in the arc of a circle about the axis of the primary distributer through an angle sufficient to enable the distributers to coöperate efficiently under various conditions of speed and material.

13. In an apparatus of the character described, a wide spreading distributer, a primary distributer adapted to throw a stream of material in a direction to be caught in its flight by the wide spreading distributer and be given an added impulse by the latter, and means for raising and lowering the wide spreading distributer for the purpose of adapting it to varying conditions of speed and material.

14. In an apparatus of the character described, two rotary distributers arranged one behind the other and rotatable in the same direction with their uppermost points moving rearwardly, and means for adjusting the rearmost distributer in the vertical direction so as to permit it to be located in such position as best to act upon a stream thrown rearwardly by the other distributer.

In testimony whereof, we sign this specification.

HENRY L. LITCHFIELD.
CLARENCE E. SHIPLET.

Copies of this patent may be obtained for five cents each, by addressing the "Commissioner of Patents, Washington, D. C."